Feb. 25, 1964 C. W. SKARSTROM 3,122,486
COMBINATION PROCESS COMPRISING DISTILLATION OPERATION
IN CONJUNCTION WITH A HEATLESS FRACTIONATOR
Filed July 8, 1960

Charles W. Skarstrom   Inventors
CHESTER L. READ
By W. A. Heilman
Patent Attorney United States Patent Office 3,122,486
Patented Feb. 25, 1964

3,122,486
COMBINATION PROCESS COMPRISING DISTILLATION OPERATION IN CONJUNCTION WITH A HEATLESS FRACTIONATOR
Charles W. Skarstrom, Montvale, and Chester L. Read, Westfield, N.J., assignors to Esso Research and Engineering Company, a corporation of Delaware
Filed July 8, 1960, Ser. No. 41,628
8 Claims. (Cl. 202—42)

The present invention is concerned with an improved combination operation comprising a distillation operation in conjunction with a heatless fractionator. The invention is more specifically concerned with a processing operation wherein an azeotropic mixture is removed from a distillation unit and thereafter treated in a heatless fractionator by a unique combination of processing steps in order to secure products of high purity. The invention comprises a continuation-in-part and an improvement and adaptation of the process and apparatus described in copending application, Serial No. 714,780, filed February 12, 1958, now U.S. Patent 2,944,627, issued July 12, 1960, entitled "Method and Apparatus for Fractionating Gaseous Mixtures," inventor, Charles W. Skarstrom. The invention is particularly adaptable for the treatment of azeotropic mixtures from a distillation unit comprising water and is especially adapted toward the production of high purity anhydrous alcohols.

In commercial distillations for the segregation of one component or a plurality of components from mixtures containing the same, in many instances, it is difficult to secure the desired degree of purity due to the formation of azeotropic mixtures. This is particularly the case when distilling alcohols in the presence of water. Thus, many processes have been suggested for the further processing of these azeotropic streams in order to secure the desired separation of one component of the azeotropic mixture from another component. In general, these operations are relatively expensive, and in many instances, not entirely satisfactory. In accordance with the present invention, an azeotropic mixture removed from a distillation unit is treated in combination with the technique of the heatless fractionator described in the above-identified application by unique combination and arrangement of steps in a manner to efficiently and effectively secure streams of high purity and of high yield. As mentioned, the invention is particularly adapted to the production of high purity anhydrous alcohols.

The process of the present invention may be more fully understood by reference to the drawing illustrating one embodiment of the time. While the drawing is described with respect to the azeotropic mixture comprising isopropanol and water, it is to be understood that the operation may also be applied to other azeotropic mixtures wherein water is not present. Under these latter operations, a different type of adsorbent is utilized in the heatless fractionation zones.

Referring specifically to the drawing, a crude isopropyl alcohol feed stream comprising water is introduced into distillation or fractionation zone 1 by means of feed line 2. This crude alcohol may comprise from about 25 to 60% water. Temperature and pressure conditions are maintained in distillation zone 1 in order to secure and remove overhead an isopropanol stream of high purity. The temperature in the tower is maintained at about 82.4° C. and the pressure at about atmospheric. Under these conditions, a stream comprising water is removed at the bottom of zone 1 by means of line 3 and disposed of as desired. A stream comprising isopropanol and water is removed overhead from fractionation zone 1 by means of line 4. This stream comprises about 91% isopropanol.

In accordance with the present invention, this stream is introduced into adsorption zone 5 through line 6 and valve 7. Adsorption zones 5 and 8 contain a suitable adsorbent as, for example 4A molecular sieves. Other adsorbents may be used as synthetic ion exchange resins, such as Dowex 50 or 50W (Dow Chemical Company, Midland, Michigan), Amberlite 120 (Rohm and Haas, Inc., Philadelphia, Pennsylvania), and the like. The vapor feed flows upwardly through zone 5 and an advancing concentration gradient of moisture on the adsorbent is secured as the cycle progresses. The pressure in zone 5 is at a relatively high pressure as compared to zone 8, which is maintained below atmospheric pressure. The temperatures in zones 5 and 8, preferably, are at the temperatures of the distillation zone 1. In all instances, substantially no heat is added to or removed from the respective zones other than the gases that bring in and remove heat. The dry vapor is removed from the top of zone 5 by means of line 9 and passed through check valve 10. This dry gas or alcohol vapor passes through line 11, passes through valve 12, is cooled in cooler 13 and passed to a separation drum or zone 14. Uncondensed gases are removed overhead from zone 14 through valve 15 while an anhydrous alcohol is removed from the bottom of separation zone 14 by means of line 16 and valve 17. During the adsorption cycle on zone 5, valve 18 is closed and flow of vapor through check valve 19 is prevented.

At the beginning of the adsorption cycle on zone 5, valve 35 opens and valve 20 is closed. This permits a suction to be drawn on zone 8 by means of pump 21 through valve 22. The vapor comprising water removed from zone 8 is passed through a cooler or condenser 23, through check valve 24 by means of line 25 and is introduced into zone 26 by means of line 27. This condensate is withdrawn from the bottom of zone 26 by means of line 28 and reintroduced into the feed line 2 by means of pump 29 and line 30. Under certain conditions, if the stream removed from the bottom of zone 26 is richer in alcohol than the feed stream to the still, then this stream should be introduced into distillation zone 1 at a higher plate by means of line 31.

When the pressure in zone 8 undergoing desorption drops to a predetermined point on the desorption cycle, the second phase starts. Under these conditions, a portion of the overhead from adsorption zone 5 passes through valve 32, check valve 33 and is introduced into the top of zone 8, backwashing this zone undergoing desorption at a relatively low pressure. This will cause a decreasing concentration gradient of moisture to advance downwardly through zone 8. When zone 8 has been desorbed to the desired degree, valve 35 closes and zone 8 is repressured to the desired degree by the effluent from the top of zone 5. It is to be understood that a surge tank may be positioned in line 11 from which zone 8 may be repressured. It is also to be understood that the repressuring of the zone on the desorption cycle may be accomplished from the feed and by suitable means, such as by opening of valve 20 and the closing of valve 35.

During adsorption, an advancing concentration gradient of the moisture advances upwardly through zone 5. When zone 8 is substantially desorbed, as described, and zone 5 is substantially saturated, as described, then zone 8 will go on the adsorption cycle and zone 5 on the desorption cycle. This is accomplished by closing valve 35 and opening valve 20, and by the closing of valve 7 and the opening of valve 18. Under these conditions, zone 8 will be at a relatively high pressure and zone 5 will drop to a relatively low pressure. In the first phase of the desorption cycle on zone 5, moisture will be removed from the adsorbent and flow through valve 18, line 36, through pump 21 and will be handled as hereinbefore described with respect to the stream removed from the bottom of zone 8. After zone 5 has reached a predetermined degree of desorption, a portion of the dry stream removed overhead from zone 8, through valve 43 and line 34, will be passed through valve 32, valve 19 and will be reintroduced into the top of zone 5, thus backflowing through zone 5. This stream will be removed from the bottom of zone 5 and will be handled as described with respect to zone 8. In the third stage of the latter half cycle, zone 5 is repressured either from the top, using a part of the effluent from zone 8, or zone 5 can be repressured from the feed and by the closing of valve 18 and the opening of valve 7. The interaction of the valve and the timing program is secured by the use of a solenoid valve cycle timer (not shown), or its equivalent.

A particular adaptation of the present invention is to operate zones 8 and 5 at a temperature somewhat below the temperature in the distillation unit 1. For example, distillation unit 1 may be run at about 80° C., whereas, zones 8 and 5 may be operated at about 20° C. When utilizing this mode of operation, an inert gas, such as nitrogen or helium, is introduced into the system by means of line 40 and mixed with the overhead in line 4. Thus, although the temperature of the isopropanol overhead stream is reduced by the introduction of the inert gas, condensation will not occur due to the partial pressure conditions.

Under these conditions, the stream removed overhead on the adsorption zone comprises an inert gas which is passed to separator 14. The inert gas is removed overhead through valve 15, line 41 and may be removed from the system. However, it is preferred to recycle this inert gas by means of line 42 and to reintroduce the same into the top of the zone undergoing desorption such as zone 8, through valve 33 in a manner as hereinbefore described. This is accomplished by utilizing a valve 44 and closing off valve 32. If no inert gas is utilized, then non-condensible gas accumulating in 26 can be bled off through valve 45 and removed from the system by means of line 40.

It is within the concept of the present invention to condense the azeotropic mixture removed overhead from the distillation zone and to introduce this liquid feed into the adsorption zone for the purpose of removing an impurity, such as water therefrom. Then for the purpose of backflowing in the second stage more of the desorption cycle, a portion of this liquid product removed from the zone undergoing adsorption is flashed into the vapor phase and backflowed through the zone undergoing desorption. When condensation of the distillation zone overhead is desired the distillate material from line 4 is flowed through line 47 and valve 48 into condenser 49. The liquid material from condenser 49 is then flowed through line 50 and valve 51 back into line 4.

Anhydrous alcohols are needed in industry as solvents, as an additive to gasoline and as the starting material for the many useful alcohol derivatives. The drying of alcohols is currently a difficult process. This is because they form constant boiling mixtures with water. Since water is usually present in the manufacture of synthetic alcohols from petroleum, the drying step is always a major part of the processing needed to make a high purity alcohol. The drier the desired product, the more elaborate the processing must be. This invention teaches an effective process and means to separate azeotropic mixtures, particularly, water-alcohol mixtures.

The novel combination process consists of distillation of the crude alcohol to its azeotropic water mixture, followed by desiccation of the azeotrope by heatless drying over a water selective adsorbent.

Examples of constant boiling water-alcohol mixtures are shown in the following table:

TABLE 1

| Alcohol | Pure Boiling Pt., °C. | Constant Boiling Mixture with Water | |
|---|---|---|---|
| | | Wt. Percent Water | B.P., °C. |
| Methyl | 64.7 | | |
| Ethyl | 78.5 | 2.8 | 78.1 |
| n-Propyl | 97.2 | 28.3 | 87.7 |
| Isopropyl | 82.4 | 12.1 | 80.2 |
| n-Butyl | 117.7 | 38.0 | 92.2 |
| Sec. Butyl | 99.5 | 27.7 | 87.5 |
| Ter. Butyl | 82.8 | 11.8 | 79.9 |
| Sec. Amyl | 119.2 | | 92.3 |

As a particular example, consider isopropyl alcohol. The crude alcohol is distilled to 91% by volume (88.9 wt. percent), coming off the still as an overhead stream. This azeotropic alcohol-water mixture is a commercial product, but it is not suitable for many solvent purposes nor as an anti-ice additive for gasoline. Further desiccation is needed. This is often done by further distillation at a different pressure and/or with a third component, giving a commercial product 99% by volume. To dry the alcohol beyond this point requires an excessively large number of plates in the distillation tower or a marked reduction in the tower throughput. The large number of effective plates in a heatless dryer make it an advantageous process to dry the 91% azeotropic mixture to anhydrous isopropanol. The low pressure purge and dumped gases rich in water may be returned to the crude alcohol feed line to the distillation tower.

The present invention may be readily understood by the following example:

*Example*

Dry nitrogen at 50 p.s.i.g. was bubbled through a saturator containing 91 vol. percent liquid isopropanol. Water was the major impurity. This satuarted $N_2$ was feed for a small heatless dryer. The dryer's two beds were each 0.0061 cu. ft. (6" x 1½" I.D.), and each held 40 gm. Dowex 50 X4 synthetic ion exchange resin beads supported throughout 40 gm. of cotton string packing. The cycle timer allowed each bed to be on adsorption two minutes, then dump, atmospheric backpurge and repressure—two minutes.

The dry product was removed continuously. During each two minutes of a seven hour run, the following gas flows occurred:

| | Feed | Dry Product | Purge | Dump |
|---|---|---|---|---|
| S.c.f./2 Min | 0.617 | 0.35 | 0.227 | 0.04 |
| Std. v./v./2 Min | 101 | 57 | 37 | 6.1 |
| Actual v./v./2 Min | 25 | | 37 | |

The average pressure in the high pressure bed was 46 p.s.i.g. Thus, the pressure ratio $P_{Hi}/P_{Lo} = 46+14.7/14.7 = 4.1$. The ratio of actual purge/feed volume per cycle was 37/25=1.48. This was 48% more than the usual minimum 1:1 volume rule required, giving a good driving force for low level drying.

Before starting the 91% isopropanol run, the heatless dryer had been conditioned with water saturated nitrogen until the dry product showed 1 to 2.5 mol p.p.m. $H_2O$. Flows were the same as listed above. At the beginning of the run, when the $N_2$ feed was switched through the 91% isopropanol saturator, the dry effluent moisture content rose to 2.5 to 4 mol p.p.m. $H_2O$. After the hour the product's moisture content returned to 1 to 2.5 p.p.m. and became slightly less by end of the seven hour run. Anhydrous isopropanol liquid was removed from the product stream by a cold trap. In the nitrogen, reduced to atmospheric pressure, the isopropanol dew point was +40° F., corresponding to 12 mm. Hg pure isopropanol partial pressure. Partial pressure of water vapor in the dry $N_2$ product, corresponding to 1.8 mol p.p.m. average, was 0.0013 mm. Hg. Thus, the isopropyl alcohol liquid when condensed in the cold trap contained no more than 0.0013/12=0.00011 mol fraction water, viz., no more than 110 mol p.p.m. or 33 wt. p.p.m. $H_2O$. The product isopropanol was essentially anhydrous.

During the seven hour run, 145 gm. pure isopropanol mixed with water vapor was brought into the heatless dryer by the $N_2$ carrier feed. The dry product contained 82 gm. anhydrous isopropanol. Based on feed, the isopropanol recovery was 100×82/145=57%. For a pressure ratio of 4.1, the maximum recovery was (1–¼.1)×100—75%. The actual recovery in the heatless dryer is close to the maximum. In the combination process of this invention, recycle of isopropanol in the dump and purge gas goes to the distillation tower feed and consequently does not get lost. In the combination process, the isopropanol recovery is 100%.

Thus, the present invention covers the processing of a constant boiling mixture which is passed from a still to a heatless fractionator where minor components are separated and returned to the still in a novel combination process. It is particularly effective for processing alcohol-water azeotropes which are separated by combination distillation and heatless drying. 100% recovery of anhydrous alcohols is technically feasible by this novel combination process. Desirable desiccants are synthetic ion exchange resins such as Dowex 50 to 50W,[1] Amberlite 120,[2] etc. These materials have extreme selectivity to adsorb only water vapor. They are not used widely as desiccants because they cannot be heated above 250° F. for heat regeneration. Thus, they are ideally suited to heatless drying. Also, the swelling when wet, shrinking when dry problem is solved by novel non-rigid packing support such as cotton string, synthetic fibers, glass wool, etc. When alumina, silica gel, molecular sieves are used as desiccant for alcohols in a heatless dryer, they adsorb the alcohols as well as the water. Because of this, much heating and cooling of the beds occurs on the pressure buildup and discharge. With these desiccants, the large and frequent temperature cycle in the beds makes the heatless drying process much less efficient. With the ion exchange resins, very little alcohol adsorption occurs. The only heating and cooling is due to water adsorption and desorption.

Minor components in the overhead of any distillation tower can be readily removed by heatless fractionation and returned to a lower point in the tower, thus, increasing towers throughput by this novel combination. The adsorbent should be selective for the minor components which provides a very large number of equivalent plates in the heatless fractionator.

Also the novel use of an inert carrier gas in a heatless dryer makes possible: operations at a high pressure ratio between adsorption and regeneration; allows both pressures to be above atmospheric even though the partial pressure of the components being separated are both below atmospheric pressure (this stops in leakage of air); allows the temperature of operation to be closer to ambient; allows better product recovery because the disengaged inert gas is all used for backpurge; can provide large actual backpurge volume/feed volume ratio for higher throughput per cycle; inert gas is not used up since it recycles in both directions, however, small makeup is needed for leakage and loss by solution in liquid product; and use of inert carrier gas insures unsaturation and minimizes occurrence of slugs of liquid condensate in the heatless dryer.

As pointed out heretofore, the technique of the pressure cycling of the present invention is particularly adapted for employing as adsorbents materials heretofore not utilized as adsorbents due to the fact that when heating to desorb, these adsorbents deteriorated. In general, these adsorbents are synthetic ion exchange resins, such as Dowex 50 or 50W (X4, X10) or Amberlite 120. Dowex is manufactured by the Dow Chemical Company of Midland, Michigan, and Amberlite 120 is manufactured by Rohm & Haas, Inc., Philadelphia, Pennsylvania. In general, these polymers may comprise a polystyrene which has been cross-linked with divinyl benzene and further treated, such as sulfonated. Typical ion exchange resins are those described on pages 60 to 61 of the "Chemical and Engineering News" of November 30, 1959. Other typical ion exchange adsorbents which may be used in accordance with the present invention are those described on pages 76, 77, 78, 79 and 80 of "Chromatography," A Review of Principles and Applications, by Edgar Lederer, Professor of Biochemistry, Sorbonne; Directeur de Recherches, Institut de Biologie Physico-Chimique, Paris; and Michael Lederer, Maitre de Recherches, Institut du Radium, Paris, second, completely revised and enlarged edition, Elsevier Publishing Company, Amsterdam, London, New York, Princeton, 1957. Other properties of the ion exchange resins are summarized in a publication by the Dow Chemical Company, entitled "Dowex:Ion Exchange," The Dow Chemical Company, Midland, Michigan, published in 1958 and 1959. Appendix B appearing on pages 71 through 75 lists the resin properties.

Thus, in general, the process of the heatless dryer is particularly adapted for adsorption of a key component from a mixture containing the same, utilizing materials as adsorbents normally not satisfactory for adsorption processes due to the fact that these materials are of the class of materials which are unstable at elevated temperatures and, therefore, deteriorate upon heating to desorb. Normal desorption temperatures are of the magnitude of 100° to 1,000° F. General desorption temperatures range from about 300° to 600° F. For example, when removing water from silica gel utilizing air, the temperature of the air is in the range from about 300° to 400° F. When removing water from molecular sieves utilizing air, the temperature of the air is in the range from about 500° to 600° F. The resins or material thus described will not withstand these temperatures and, therefore, cannot be used for removing moisture from fluid streams except in accordance with the present invention.

What is claimed is:

1. Improved process for the recovery of a substantially pure alcohol from a water and alcohol mixture using in combination a distillation stage and a pressure cycling double zone adsorption stage, which comprises introducing a feed stream containing water and alcohol into a distillation zone, removing a distillate stream consisting essentially of an alcohol-water azeotrope from said distillation zone, passing said distillate stream to an adsorption stage utilizing two adsorbent beds, said process comprising the steps of flowing said distillate stream including water through a first bed of an ion exchange resin adsorbent initially relatively free of water at a preselected initial relatively high pressure and in a positive flow direction in an initial cycle, said ion exchange resin adsorbent being preferentially selective for water; discharging a stream from said first bed as a primary effluent; segregating a portion of said primary effluent as a product stream and withdrawing the same; passing the remainder of said primary effluent in a reverse flow direction through a second bed of an ion exchange resin adsorbent at a relatively low pressure, which ion exchange resin adsorbent is relatively saturated with water as compared to said first bed at the start of said initial cycle, whereby as said initial cycle continues, said first bed becomes relatively saturated with water progressively in said positive direction, and whereby said second bed becomes relatively freed from water in said reverse direction; discharging a

---

[1] Dow Chemical Company, Midland, Mich.
[2] Rohm and Haas, Inc., Philadelphia, Pennsylvania.

stream from said second bed of adsorbent as a secondary effluent; recycling at least a portion of said secondary effluent to said distillation zone; continuing said initial cycle for a time period less than that required to secure saturation of said first bed and that required to secure freedom from water of said second bed; thereafter introducing said distillate stream into said second bed in positive flow direction at said initial relatively high pressure; discharging said liquid stream from said second bed as a primary effluent; segregating a portion of said last named primary effluent as a product stream and withdrawing the same; passing the remainder of said last named primary effluent in reverse flow through said first bed of adsorbent at said relatively low pressure discharging a stream from said first bed of adsorbent as a secondary effluent; recycling at least a portion of said last-named secondary effluent to said distillation zone and thereafter cyclically continuing the operation and wherein substantially the sole transfer of heat to said remainder of said primary effluent occurs within said beds.

2. Process as defined by claim 1 wherein the stream passed to said adsorption stage is in the vapor phase.

3. Process as defined by claim 1 wherein said stream removed from said distillation stage is condensed and introduced into said adsorption stage, and wherein a portion of the primary effluent passed to the low pressure stage is vaporized before introducing the same into said low pressure stage.

4. Process as defined by claim 1 wherein an inert gas is introduced into the stream removed from said distillation stage before said stream is introduced into said adsorption stage.

5. Process as defined by claim 4 wherein said inert gas comprises nitrogen.

6. Process as defined by claim 4 wherein said inert gas is separated from the primary effluent of the high pressure stage and introduced as backwash into the low pressure stage.

7. Process as defined by claim 1 wherein said adsorbent comprises a synthetic ion exchange resin.

8. Process as defined by claim 7 wherein said synthetic ion exchange resin is a sulfonated polystyrene polymer which has been crosslinked with divinyl benzene and sulfonated.

References Cited in the file of this patent

UNITED STATES PATENTS

| | | |
|---|---|---|
| 1,985,205 | Derr | Dec. 18, 1934 |
| 2,619,497 | Hockberger | Nov. 25, 1952 |
| 2,773,774 | McCarthy et al. | Dec. 11, 1956 |
| 2,850,549 | Ray | Sept. 2, 1958 |
| 2,882,243 | Milton | Apr. 14, 1959 |
| 2,944,627 | Skarstrom | July 12, 1960 |